(12) United States Patent
Myer (10) Patent No.: US 11,972,647 B2
(45) Date of Patent: Apr. 30, 2024

(54) WHEEL-MOUNTED SENSOR CALIBRATION APPARATUS

(71) Applicant: Robert Bosch GmbH, Stuttgart (DE)

(72) Inventor: Weston Myer, Minneapolis, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 237 days.

(21) Appl. No.: 17/691,450

(22) Filed: Mar. 10, 2022

(65) Prior Publication Data
US 2023/0290196 A1 Sep. 14, 2023

(51) Int. Cl.
*G01D 21/00* (2006.01)
*G07C 5/00* (2006.01)
*G07C 5/08* (2006.01)

(52) U.S. Cl.
CPC .......... *G07C 5/0825* (2013.01); *G01D 21/00* (2013.01); *G07C 5/008* (2013.01)

(58) Field of Classification Search
CPC ....... G07C 5/0825; G07C 5/008; G01D 21/00
See application file for complete search history.

(56) References Cited

FOREIGN PATENT DOCUMENTS

| CN | 112945269 A | * | 6/2021 | ............. G01D 18/00 |
|---|---|---|---|---|
| DE | 102018215316 A1 | * | 3/2020 | ........... G01S 13/931 |
| DE | 102020214299 A1 | * | 6/2021 | ................ F16B 1/00 |
| EP | 3771922 A1 | * | 2/2021 | ......... G01B 11/2755 |
| EP | 4102178 A1 | * | 12/2022 | ......... G01B 11/2755 |
| WO | WO-2021024286 A1 | * | 2/2021 | |
| WO | WO-2022096280 A1 | * | 5/2022 | |

* cited by examiner

*Primary Examiner* — Jamel E Williams
(74) *Attorney, Agent, or Firm* — David Kovacek (57) ABSTRACT

A calibration apparatus and method suitable for aligning a primary structure in a test or calibration of a subject sensor of a vehicle. The apparatus and method utilize a wheel structure configured to detachably couple to a wheel of the vehicle. The wheel structure comprises one or more measurement arms configured to extend and measure a placement of the wheel structure with respect to the vehicle. The measurements are used to generate a reference template that a user utilizes visually to position the primary structure in a suitable position and angle with respect to the vehicle for calibration or test.

20 Claims, 5 Drawing Sheets

WHEEL-MOUNTED SENSOR CALIBRATION APPARATUS

TECHNICAL FIELD

This disclosure relates to the calibration of vehicular sensors and an associated apparatus used for the calibration thereof.

BACKGROUND

Advanced driver assistance (ADAS) functions of modern vehicles are becoming more robust and complex. ADAS functions of vehicles rely upon an array of sensors arranged around the vehicle to monitor the environmental and traffic conditions the vehicle is subjected to. Calibration of these sensors is critical to ensure proper and safe operation of the ADAS functions of the associated vehicle. Specialized calibration apparatuses have been utilized to provide calibration of the sensors associated with ADAS functions.

Existing calibration apparatuses are often bulky, unwieldly, and rely upon controlled environments and repeated measurements with respect to the subject vehicle to find their appropriate placement for a successful calibration. It would be desirable for a calibration apparatus that was functional with a minimized number of measurements in order to expedite the setup process and streamline calibration, even in field environments.

SUMMARY

One aspect of this disclosure is directed to a wheel structure apparatus for use in the calibration of a vehicle sensor. The wheel structure comprises a support member suitable to detachably mount onto a wheel of a vehicle during a sensor calibration operation and provide support to the rest of the wheel structure apparatus. The wheel structure apparatus further comprises a spine member coupled transversely lengthwise to the support member. The spine member defines a sheath running at least partially through the length of the spine member. Within the sheath is at least partially disposed an upper measurement arm and a lower measurement arm, each of the upper measurement arm and lower measurement arm configured to extend from spine member while the wheel structure apparatus is detachably mounted onto the wheel. While detachably mounted, the upper measurement arm is suitable to measure a distance from the top of the spine member to an upper arch of a wheel well of the wheel. While detachably mounted, the lower measurement arm is suitable to measure a distance from the bottom of the spine member to the surface upon which the wheel is supported (typically the ground, or the floor of a shop). When the upper measurement arm and the lower measurement arm are extended, the total measurement of the distance from arch to surface can be utilized to help a user position additional calibration structures into the proper location for sensor calibration.

Another aspect of this disclosure is directed to a sensor calibration apparatus for a vehicle having a sensor under test. The sensor calibration apparatus comprises a primary structure, a wheel structure, and a diagnostic processor. The primary structure comprises a camera in data communication with the diagnostic processor. The wheel structure comprises a support member, a spine member, a brace member, a target mount, an upper measurement art, and a lower measurement arm. Each of the upper measurement arm and the lower measurement arm are at least partially disposed within a sheath defined by the spine member. Each of the upper measurement arm and the lower measurement arm are configured to extend outward from the top and bottom of the spine member respectively to measure a distance to various reference positions related to the sensor under test. In some embodiments, the wheel structure may comprise a sensor configured to measure the extension of the upper measurement arm and the lower measurement arm and generate corresponding data indicating the measurement. In some embodiments, the wheel structure may comprise a transmitter in data communication with the sensor and configured to transmit the extension data to the diagnostic processor. When the diagnostic processor acquires the measurements of the upper measurement arm and lower measurement arm, it may calculate a placement the primary structure suitable for calibration and generate a template onto a display corresponding to the suitable placement. A user may utilize the template and image data generated by the camera to position the primary structure in the suitable placement.

A further aspect of this disclosure is directed to a method of arranging a calibration apparatus suitable for a vehicle having a sensor under test or calibration. The calibration apparatus may comprise a primary structure, a diagnostic processor, and a wheel structure. The method comprises coupling the wheel structure to a wheel of the vehicle, extending an upper measurement arm of the wheel structure to an upper arch of a wheel well in which the wheel is disposed, extending a lower measurement arm of the wheel structure to the surface supporting the wheel, generating extension data indicating the length between the upper arch and the surface, providing the extension data to the diagnostic processor, generating display data of the wheel structure coupled to the vehicle using a camera associated with the primary structure, transmitting the display data to the diagnostic processor, generating a visual template indicating a desired placement of the primary structure, and positioning the primary structure such that display data matches the visual template on the display. In some embodiments, the extension data may be generated by a sensor and provided to the diagnostic processor by means of a wireless data transmission.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
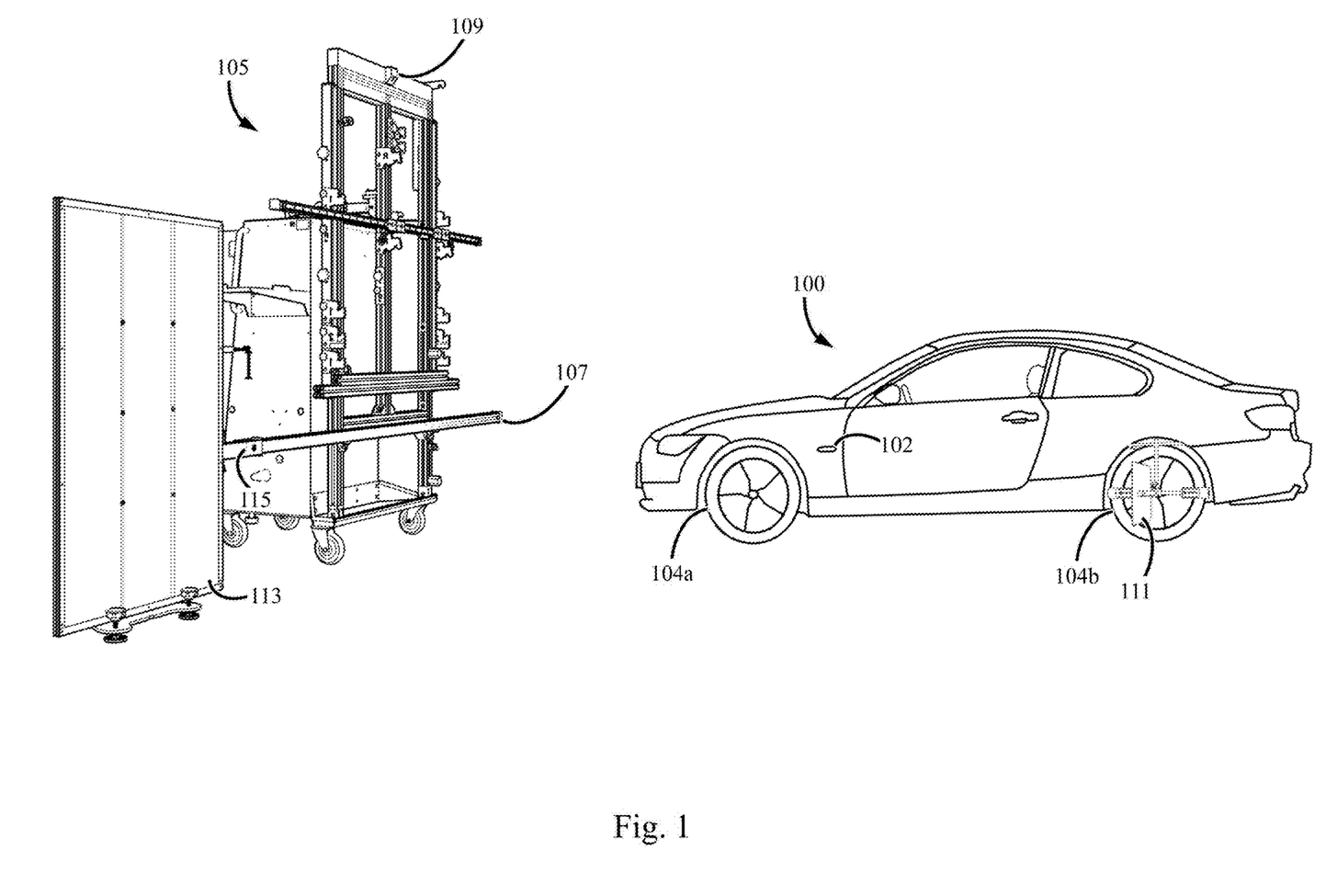
FIG. 1 is an illustration of a subject vehicle during a calibration procedure for a sensor of the subject vehicle.

FIG. 1 depicts a vehicle 100 acting as a subject vehicle of a calibration procedure directed to a sensor 102 associated with the vehicle. In the depicted embodiment, the calibration procedure is directed an offset sensor 102 but vehicle 100 may comprise additional sensors in addition to offset sensor 102. The sensors available to vehicle 100 may comprise front, rear, or side sensors arranged to detect objects or environmental conditions in a direction perpendicular or parallel to the normal forward motion of vehicle 100. In contrast, offset sensor 102 may be configured to detect objects or environmental conditions at oblique angles with respect to the normal forward motion of vehicle 100 or the perpendicular direction thereto. Examples of offset sensors may comprise lane-change sensors, blind-spot sensors, lane detection sensors, or any other offset sensor known to one of ordinary skill in the art without deviating from the teachings disclosed herein. In the depicted embodiment, offset sensor 102 comprises a lane-change sensor, but other embodiments may comprise additional or different offset sensors without deviating from the teachings disclosed herein. The sensors of vehicle 100, such as offset sensor 102, may comprise known types, such as image sensors, camera sensors, optical sensors, radar sensors, lidar sensors, proximity sensors, motion sensors, or any other vehicular sensor known to one of ordinary skill in the art without deviating from the teachings disclosed herein. By way of example, and not limitation, the depicted embodiment comprises a configuration of offset sensor 102 comprises an optical sensor, but other embodiments may comprise other configurations without deviating from the teachings disclosed herein.

Vehicle 100 additionally comprises a number of wheels 104. In previous calibration techniques, the placement of the vehicle and therefore the placements of the wheels were achieved with respect to the calibration apparatus. In the depicted embodiment, each of the components of the calibration apparatus may positioned into locus suitable for calibration in relation to the vehicle. Advantageously, placement of the apparatus in relation to the vehicle permits a relatively arbitrary placement of the vehicle to be supported by the calibration apparatus. In an additional advantage, the various components of the calibration apparatus are simply and easier to move manually than vehicle 100, which typically must be driven into a particular position.

The calibration apparatus comprises a primary structure 105 having a horizontal member 107 and camera 109, a wheel structure 111, and an offset-target structure 113 having a guide arm 115. In the depicted embodiment, the camera 109 generates image data that is utilized to determine a reference locus for the primary structure 105. Wheel structure 111 is additionally utilized to provide a distinctive subset of image data to be utilized in the placement of primary structure 105. When the primary structure 105 is successfully positioned at its respective reference locus, offset-target structure 113 may be coupled to primary structure 105 by detachably coupling guide arm 115 and horizontal member 107. Offset-target structure 113 is designed according to a specification such that when it is coupled to primary structure 105, offset-target structure 113 is in a suitable offset locus for the calibration of offset sensor 102. Notably, the placement of primary structure 105 may be utilized for the calibration of other sensors of vehicle 100, but its placement at the reference locus may be utilized to place offset-target structure 113 simply and efficiently, without additional measurements beyond those already undertaken during placement of primary structure 105. This advantageously minimizes the setup requirements for the calibration apparatus. In the depicted embodiment, wheel structure 111 is mounted to rear wheel 104b, but other embodiments may utilize different mounting, such as to front wheel 104a. In other embodiments, the calibration apparatus may omit wheel structure 111 without deviating from the teachings disclosed herein. In the depicted embodiment, the calibration apparatus comprises a single primary structure 105 and a single offset-target structure 113, but other embodiments may comprise a different number of each of these components without deviating from the teachings disclosed herein. By way of example, and not limitation, an embodiment may comprise a plurality of offset-target structures 113, each of the offset-target structures placed on opposite ends of primary structure 105 in order to provide calibration targets for symmetrical offset sensors 102 on either side of vehicle 100.

Figure 2:
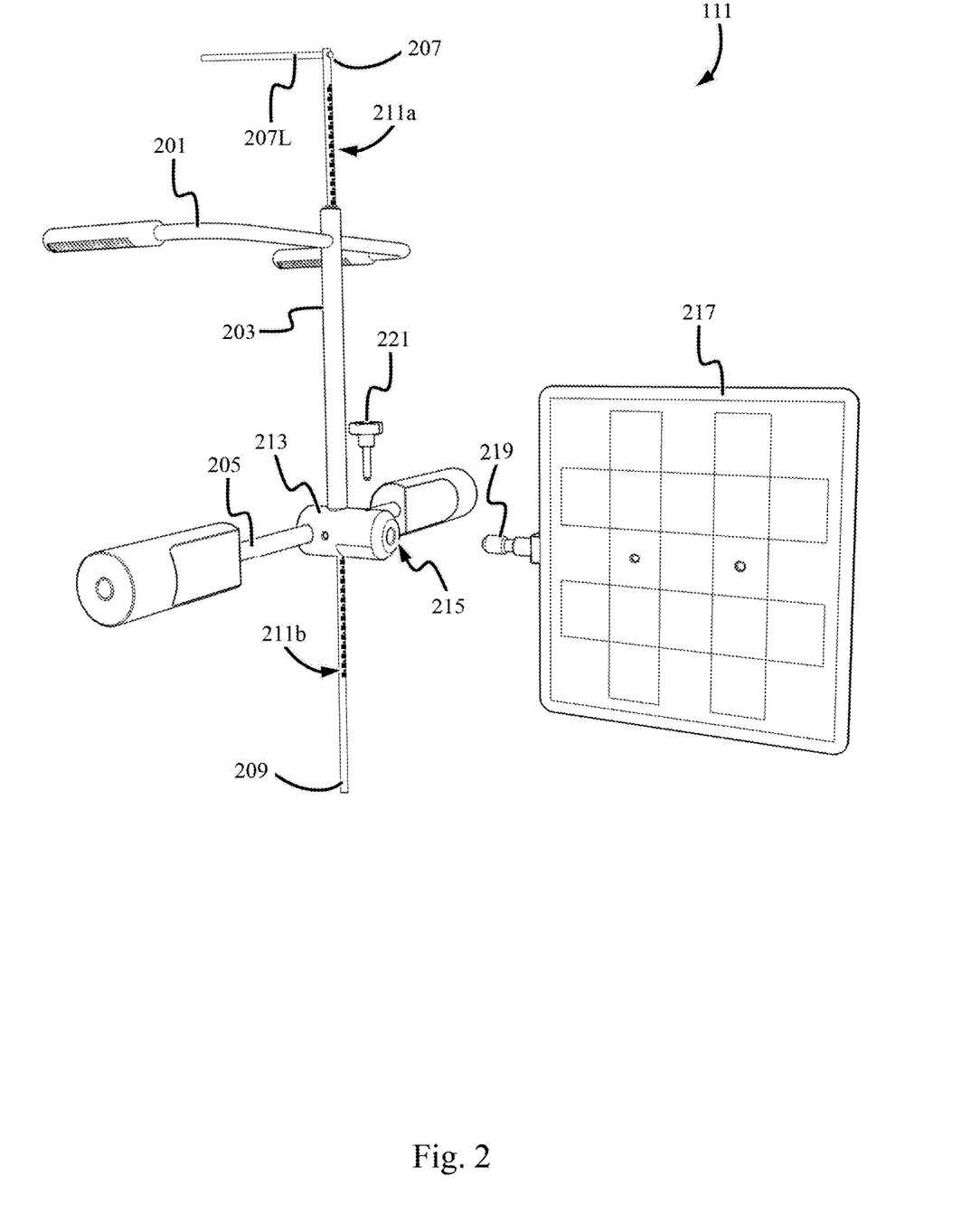
FIG. 2 is an illustration of a wheel structure of a calibration apparatus for a sensor of a vehicle.

FIG. 2 is a view of wheel structure 111 with additional detail. Wheel structure 111 comprises a support member 201. Support member 201 is configured to detachably couple with a wheel of a vehicle having a sensor for test or calibration. Support member 201 comprises a spaced pair of handles suitable for a user to move or carry the wheel structure 111, but also configured to hang the wheel structure 211 on the upper portion of a wheel of a vehicle. In the depicted embodiment, support member 201 comprises a axed-width set of handles, but other embodiments may comprise a variable-width arrangement without deviating from the teachings disclosed herein. Wheel structure 111 further comprises a spine member 203 coupled transversely lengthwise to the support member. For the purposes of the teachings herein, "coupled transversely" comprises a right angle to within a specified tolerance suitably recognized to one of ordinary skill in the art, such as ±10 degrees. Other embodiments may comprise other coupling arrangements or tolerances without deviating from the teachings disclosed herein. Spine member 203 further defines a sheath cavity therein. Coupled transversely to spine member 203 is a brace member 205. When wheel structure 211 is detachably coupled to the wheel, brace member 205 is configured to stabilize the coupling. In the depicted embodiment, brace member 205 comprises a pair of bracing pads on opposite lengthwise ends of brace member 205, but other embodiments may comprise other configurations without deviating from the teachings disclosed herein. In the depicted configuration, brace member 205 further advantageously reduces the amount of weight that must be supported during coupling by support member 201, but other embodiments may comprise different configurations without deviating from the teachings disclosed herein. Some embodiments may not comprise a brace member 205 without deviating from the teachings disclosed herein. In the depicted embodiment, each of the support member 201 and brace member 205 are coupled transversely lengthwise with respect to spine member 203, meaning that each of support member 201 and brace member 205 are transverse to spine member 203 with respect to their own longest dimension. Other embodiments may comprise other configurations without deviating from the teachings disclosed herein.

In the depicted embodiment, support member 201 is configured to engage with the tread surface of a wheel of the vehicle having a sensor under test. In most such instances, the tread surface will comprise a tire surrounding a hub of the wheel, but other arrangements may comprise alternative placements without deviating from the teachings disclosed herein. In the depicted embodiment, support member 201 and brace member 205 are configured such that when detachably coupled to the wheel, spine member 203 runs lengthwise along the center of a hub of the wheel, and each of support member 201 and brace member 205 are symmetric about the line defined by spine member 203. Other embodiments may comprise different arrangements without deviating from the teachings disclosed herein.

Wheel structure 111 further comprises an upper measurement arm 207 and a lower measurement arm 209. Each of upper measurement arm 207 and lower measurement arm 209 is at least partially disposed within the sheath defined by spine member 203 and is configured to extend outward from the ends of spine member 203. Upper measurement 207 is configured to extend outward from the top of spine member 203 to measure a distance from spine member 203 to a reference position defined by a position on the vehicle having a sensor under test. In the depicted embodiment, the reference position for this measurement comprises the apex of an arch of a wheel well in which the wheel upon which wheel structure 211 is coupled is disposed within. Other embodiments may utilize additional or different reference positions without deviating from the teachings disclosed herein. In the depicted embodiment, the apex of the wheel well is advantageously utilized because its position with respect to the wheel hub and the chassis of the vehicle is independent of any wear in the tread of the associated wheel, and thus the associated measurements are consistent irrespective of the condition of the tread of the wheel.

In the depicted embodiment, upper measurement arm 207 comprises an L-shaped member suitable for finding the apex of the wheel well irrespective of the shape of the vehicle's chassis. In the depicted embodiment, upper measurement arm 207 comprises an L-shape having a foot 207L that is configurable in length utilizing a sliding mechanism, but other embodiments may comprise other configurations without deviating from the teachings disclosed herein.

Lower measurement arm 209 is configured to extend downward from the bottom of spine member 203 to measure the distance from spine member 203 to a reference position defined by a position relative to the vehicle having a sensor under test. In the depicted embodiment, the reference position for this measurement comprises the surface upon which the wheel rests, such as the ground or the floor of a shop. Other embodiments may utilize other reference positions without deviating from the teachings disclosed herein, such as a service platform, a wheel lock, or a measurement mat corresponding to a make and model of the vehicle. In the depicted embodiment, the supporting ground or floor surface is advantageously utilized because its position with respect to the wheel hub and chassis of the vehicle is independent of any wear in the tread of the associated wheel, and thus the associated measurements are consistent irrespective of the condition of the tread of the wheel.

Each of upper measurement arm 207 and lower measurement arm 209 may be held in place using a movement-restriction mechanism. In the depicted embodiment, the movement-restriction mechanism may comprise a ratchet mechanism configured to interface with the interior of the sheath defined by spine member 203, but other embodiments may comprise other configurations without deviating from the teachings disclosed herein. In some embodiments, movement-restriction may be achieved utilizing a pin, a collar, a locking button, a latch, or another mechanism recognized by one of ordinary skill in the art without deviating from the teachings disclosed herein. In some embodiments, only the upper measurement arm 207 may comprise a movement-restriction mechanism without deviating from the teachings disclosed herein. Such embodiments may be advantageous for embodiments wherein the lower measurement arm 209 extends to a ground surface because only the upper measurement arm 207 is extending against the pull of gravity.

Measurements of the extension of the upper measurement arm 207 and the lower measurement arm 209 may utilize a set of graduated demarcations 211. Each of the graduated demarcations 211 comprise a series of measured markings indicating a distance along the length of respective measurement arm. In the depicted embodiment, graduated demarcations 211a correspond to a measurement for upper measurement arm 207 and graduated demarcations 211b correspond to a measurement for lower measurement arm 209. The graduated demarcations 211 may comprise explicit caliper measurements (e.g., as a ruler or tape measure would have) or abstracted measurements for use with other components of the calibration apparatus. In the depicted embodiment, the measurements of the measurement arms may be provided to a diagnostic processor in conjunction with image data generated by a camera (such as camera 109; see FIG. 1) to position a calibration structure (such as primary structure 105; see FIG. 1) at a position and angle with respect to the vehicle suitable for test or calibration of sensors.

Wheel structure 111 further comprises a mounting chassis 213 providing a target mount 215 suitable for detachable coupling of an associated calibration target 217 used during test or calibration. In the depicted embodiment, target mount 215 comprises a slot to receive a mounting arm 219 of calibration target 217, but other embodiments may comprise different mounting hardware configurations without deviating from the teachings disclosed herein. In the depicted embodiment, wheel structure 111 further comprises a mounting pin 221 configured to secure the mounting arm 219 within target mount 215 by passing through mounting chassis 213 without deviating from the teachings disclosed herein. Other embodiments may comprise a different securing mechanism than mounting pin 221 or may have no securing mechanism without deviating from the teachings disclosed herein.

Figure 3:
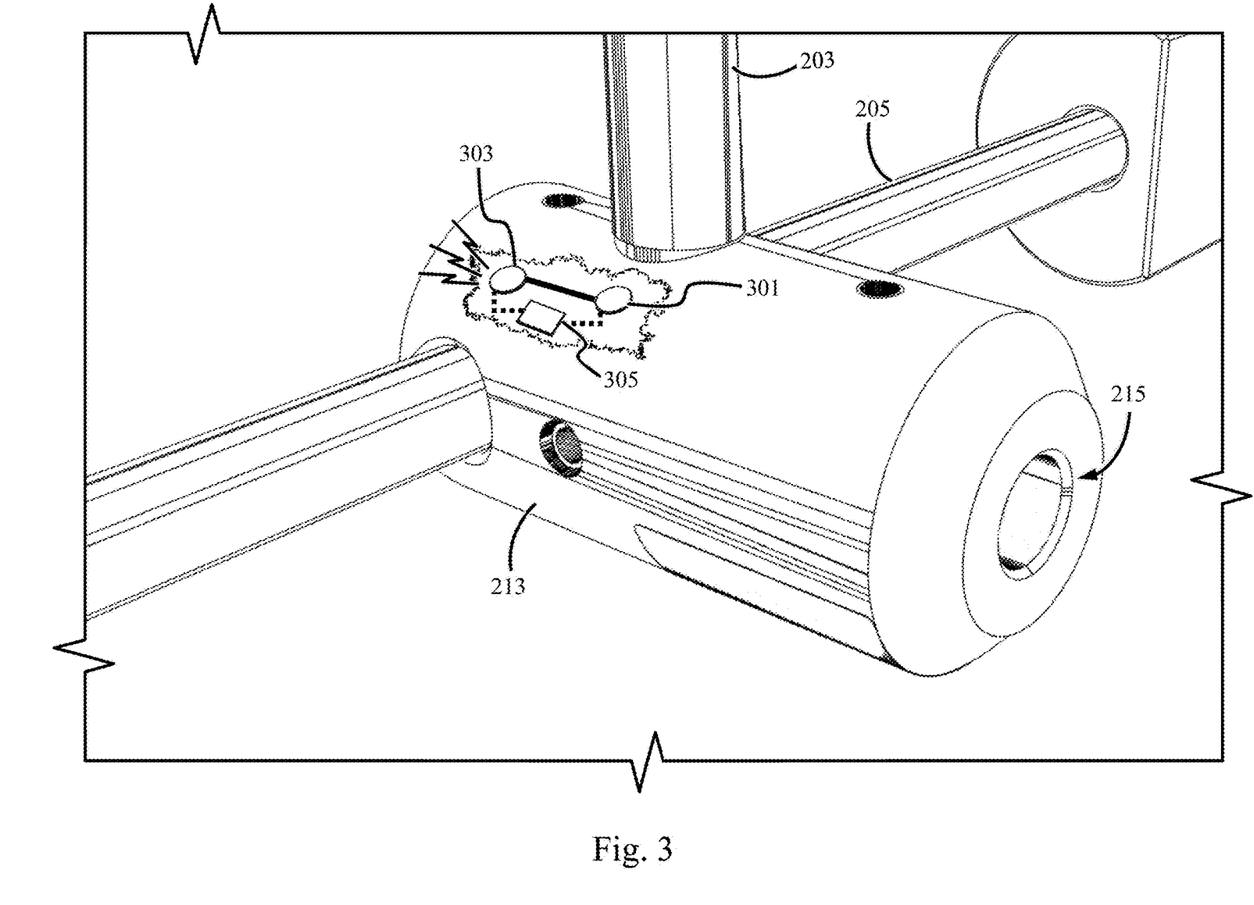
FIG. 3 is a diagrammatic illustration of a brace member of a wheel structure of a calibration apparatus for an offset sensor of a vehicle.

Additional features of wheel structure 111 may advantageously improve the ergonomics, efficiency, and ease-of-use thereof. FIG. 3 provides a diagrammatic cutaway view of brace member 205, and more specifically components interior to mounting chassis 213. Although these components in the depicted embodiment are disposed within mounting chassis 213, other embodiments may comprise other placements thereof on the wheel structure 111 without deviating from the teachings disclosed herein. Wheel structure 111 may further comprise a sensor 301 configured to measure the extension of each of the measurement arms (see FIG. 2) and generate corresponding extension data indicating the measurement. In the depicted embodiment, sensor 301 may comprise a rotational measurement senor suitable to measure the number of rotations of the ratchet of the movement-restriction measurement, but other sensors may be utilized in other embodiments without deviating from the teachings disclosed herein. Other embodiments may comprise one or more of an optical distance sensor, an ultrasonic distance sensor, a proximity sensor, a range finder, a caliper displacement sensor, a spring tension sensor, a linear tape displacement sensor, or any other sensor recognized by one of ordinary skill in the art without deviating from the teachings disclosed herein. The extension data may be generated automatically and transmitted to an associated diagnostic device (not pictured) via a transceiver 303 in data communication with the sensor 301. In the depicted embodiment, a bi-directional wireless transceiver 303 is utilized, but other embodiments may comprise distinct transmitter and receivers for establishing data communication with a diagnostic processor. In some embodiments, a wired connection may be utilized without deviating from the teachings disclosed herein. In the depicted embodiment, the automatic generation and transmission of the extension data advantageously reduces the number of measurements and inputs a user must make to inform an associated diagnostic device. In some embodiments, a user may still utilize the graduated demarcations 211 to manually measure the heights of a wheel structure 111 and manually provide the extension data to a diagnostic processor without deviating from the teachings disclosed herein. In the depicted embodiment, a user may manually determine the extension data this way as a form of additional check that the automatically-generated extension data is accurate. If the automatically-generated extension data is found to be inaccurate, a user may advantageously utilize this discrepancy to calibration sensor 301.

Transceiver 303 may be configured to communicate wirelessly via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art. In wired embodiments, transceiver 303 may comprise a TCP/IP connection, a local area network (LAN) connection, a plain-old-telephone-service (POTS) connection, an Internet protocol connection, an electrical wiring, a conductive channel, an electrical bus, a fiber optic pathway, or any other alternative embodiment known to one of ordinary skill in the art.

Each of sensor 301 and transceiver 303 may be provided with electrical power from a power source 305 in electrical communication with both the sensor 301 and transceiver 303. In the depicted embodiment, power source 305 may comprise a rechargeable battery, but other embodiments may utilize a replacement battery or a wired connection to an external power supply without deviating from the teachings disclosed herein.

Figure 4:
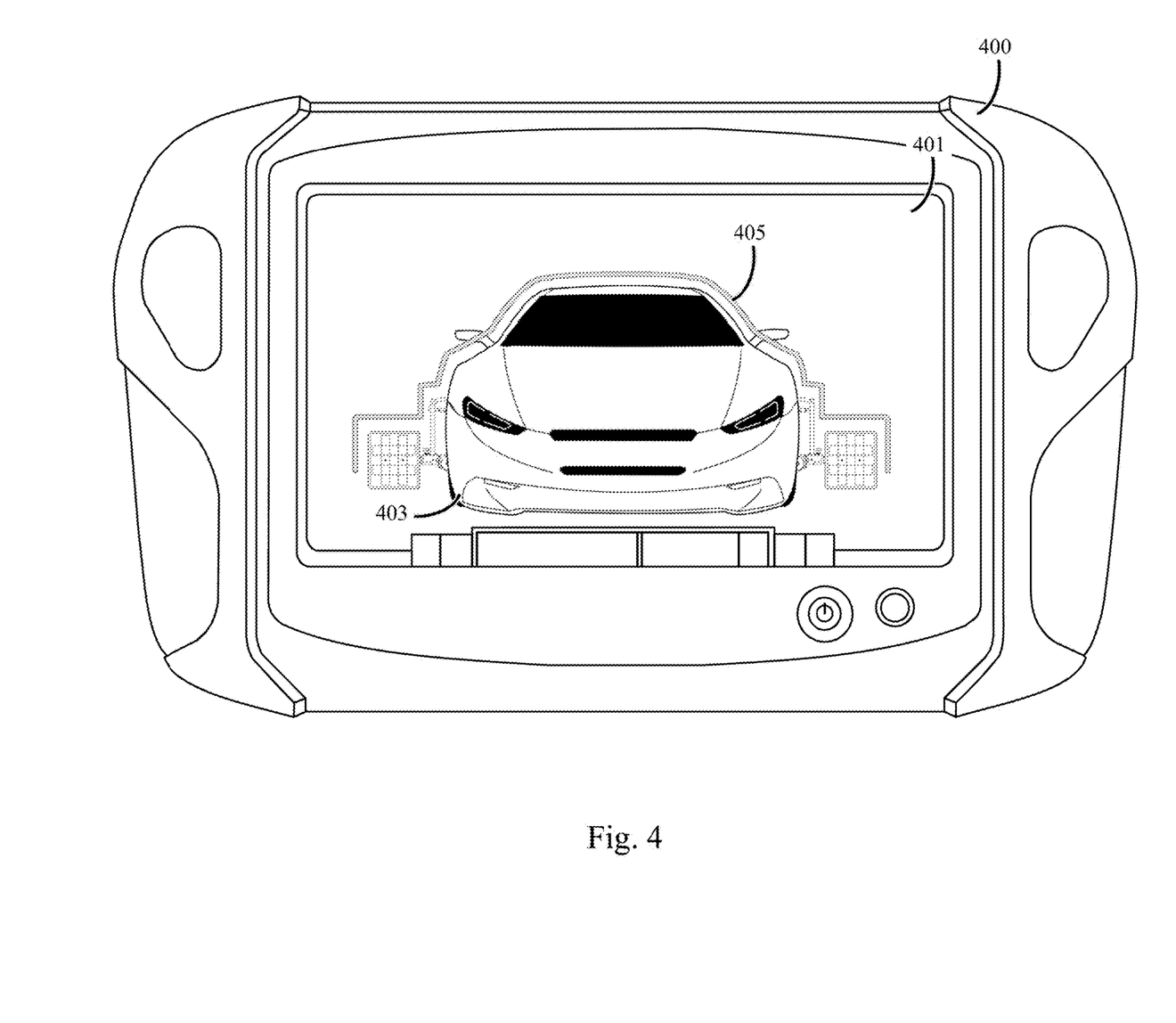
FIG. 4 is an illustration of a diagnostic device illustrating image data on a display along with a silhouette reference template.

FIG. 4 is a depiction of a diagnostic device 400 in data communication with camera 109 of an associated reference structure 105 (not shown; see FIG. 1). In the depicted embodiment, diagnostic device 400 is in wireless data communication with sensor 301 via transceiver 303 (see FIG. 3), but other embodiments may comprise different configurations without deviating from the teachings disclosed herein. Some embodiments may additionally be in data communication with other cameras without deviating from the teachings disclosed herein. Diagnostic device 400 comprises a display 401 that displays image data 403 generated by the associated camera in real time. In the depicted embodiment, the image data 403 depicts a subject vehicle (such as vehicle 100; see FIG. 1) arranged with a pair of wheel-target structures 111 (see FIG. 2). Also displayed is a visual reference depicting an expected aspect of the image data to be observed when the associated reference structure 105 has been properly positioned at the reference locus. In the depicted embodiment, the visual reference comprises a reference template 405. In the depicted embodiment, the reference template 405 comprises a silhouette reference template depicting an upper silhouette of the vehicle and the wheel-target structures, but other embodiments may comprise other reference templates. Other embodiments having different visual reference forms, or different reference templates, which may comprise full depictions of the vehicle, partial depictions of the vehicle, an arrangement of symbols on the display, an active positional/direction indicator guiding a user as to how to move reference structure 105, or any other displayable reference template known to one of ordinary skill in the art without deviating from the teachings disclosed herein.

Reference template 405 is computed based upon the make and model of the subject vehicle, and the positioning of the wheel structures 111. The placement of wheel structures 111 may be determined based upon the extension of the upper measurement arm 207 and lower measurement arm 209 of each wheel structure 111. Using the known dimensions of the vehicle chassis and the position of each wheel structure 111, the diagnostic processor is able to calculate a reference template 405 indicating how the image data provided by a camera should appear when the associated structure (such as primary structure 105; see FIG. 1) is suitably placed to test or calibrate a particular sensor of the vehicle.

In some embodiments, diagnostic device 400 may be mounted to a designated placement (not shown) on reference structure 105 in order to optimize the ergonomics of placement. For example, diagnostic device 400 may be mounted to a placement position on the side of reference structure 105 opposite camera 109 so that a user may watch the display 401 in real time while positioning the reference structure 105 without interfering with the image data generated by camera 109. In the depicted embodiment, diagnostic device 400 comprises a tablet processing device having a processor (not shown) and a touchscreen display 401. In some embodiments, diagnostic device 400 may comprise a smartphone, portable computing device, wearable computing device, or specialized camera display without deviating from the teachings disclosed herein. In some embodiments, diagnostic device 400 may comprise additional user input and output functions, such as auditory or haptic controls or output components, without deviating from the teachings disclosed herein.

Diagnostic device 400 may comprise a memory (not shown) storing thereon a plurality of reference templates to advantageously improve compatibility of the calibration apparatus with a variety of models of sensor or models of vehicle. In some such embodiments, multiple reference templates having different display configurations—such as a silhouette reference template as well as a full-image reference template—may be provided for a single configuration of a subject vehicle in order to accommodate user display preferences. In some embodiments, additional reference templates may be accessed from external storage, from a network connection, from an Internet connection, or from a cloud-based storage device without deviating from the teachings disclosed herein. Accessing additional reference templates from external locations advantageously improves the usability of diagnostic device 400 by providing compatibility with new and different models of sensor or vehicle as they become available. Access to these additional reference templates may be provided for a charge, such as a flat fee for external storage media or a subscription service for continued access to cloud storage.

Figure 5:
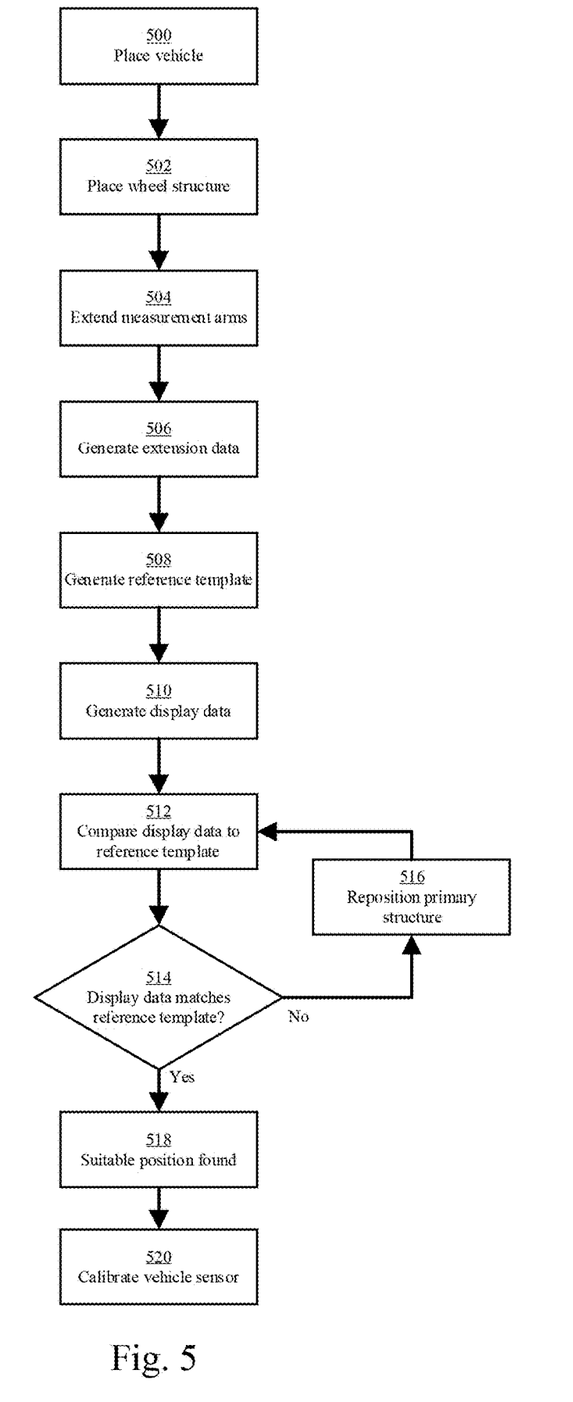
FIG. 5 is a flowchart of a method for arranging a calibration apparatus such that it is suitable for calibrating an offset sensor of a vehicle.

FIG. 5 is a flowchart depicting a method of arranging a calibration apparatus having a primary structure (such as primary structure 105; see FIG. 1) and a wheel structure (such as wheel structure 111; see FIG. 1-3) with respect to a subject vehicle having a subject sensor suitable for test or calibration. The method begins at step 500, where the subject vehicle is placed in a suitable location having sufficient room for the placement of the associated primary structure and wheel structure(s). After the vehicle has been placed in position, the wheel structure may be detachably coupled to the wheel at step 502, and a calibration target (such as calibration target 217) may be mounted in embodiments utilizing a calibration target. After the wheel structure has been placed, the method proceeds to step 504, where the measurement arm(s) of the wheel structure are extended, and the method generates associated extension data at step 506.

After the extension data is generated, the method proceeds to step 508, where a reference template may be generated by a diagnostic processor (such as a processor associated with diagnostic device 400; see FIG. 4). In the depicted embodiment, the diagnostic processor may receive the extension data via a wireless transmission from the wheel structure (see FIG. 3) or the user may manually enter the extension data along with the make and model of the subject vehicle. The method proceeds to step 510, where display data is generated from a camera (such as camera 109; see FIG. 1) associated with the primary structure and is presented on a display associated with the diagnostic processor. The display data is then compared to the reference template at step 512. In the depicted embodiment, the comparison may be automatically performed by the diagnostic processor according to a comparison algorithm, or the comparison may be performed visually by a user. The method proceeds to step 514, where the results of the comparison are used to determined if the display data matches the reference template. If the display data sufficiently does not match the reference template, the method proceeds to step 516, and the primary structure is repositioned with respect to either position or angle relative to the subject vehicle, and another comparison is made as the method returns to step 512. These comparisons continue until it is determined at step 514 that a suitable comparison result has been achieved, and the method continues to step 518 and the position and angle of the primary structure is accepted. Finally, the method may continue to step 520 and the primary structure may be utilized in a calibration or test method of a subject sensor associated with the subject vehicle.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A wheel structure apparatus comprising:
   a support member;
   a spine member coupled transversely lengthwise to the support member, the spine member defining a sheath;
   a brace member coupled transversely lengthwise to the spine member;
   an upper measurement arm at least partially disposed within the sheath and configured to extend upward out of the top of the spine member;
   a lower measurement arm at least partially disposed within the sheath and configured to extend downward out of the bottom of the spine member; and
   wherein the support member is configured to detachably mount onto a wheel of a vehicle and support the other components of the wheel structure apparatus while detachably mounted.

2. The wheel structure apparatus of claim 1, wherein the upper measurement arm is configured to extend to an upper arch of a wheel well of the vehicle.

3. The wheel structure apparatus of claim 1, wherein the lower measurement arm is configured to extend to the surface upon which the vehicle is supported.

4. The wheel structure apparatus of claim 1, further comprising:
   a sensor configured to measure the extension of the upper measurement arm and the lower measurement arm and generate corresponding extension data indicating the measurement; and
   a wireless transmitter in data communication with the sensor and configured to wirelessly transmit the extension data.

5. The wheel structure apparatus of claim 1, wherein the upper measurement arm comprises a ratchet system configured to control the retraction of the upper measurement arm when extended.

6. The wheel structure apparatus of claim 1, further comprising a target mount coupled to the wheel structure apparatus, the target mount configured to couple with a calibration target associated with a vehicular sensor calibration procedure.

7. The wheel structure apparatus of claim 6, wherein the brace member comprises the target mount.

8. The wheel structure apparatus of claim 6, further comprising a calibration target configured to couple to the target mount when the wheel structure apparatus is coupled to the wheel of the vehicle.

9. The wheel structure apparatus of claim 1, wherein the wireless transmitter comprises a wireless transceiver configured to receive wireless commands from an external processor.

10. A sensor calibration apparatus comprising:
    a primary structure having a camera;
    a diagnostic processor in data communication with the camera; and
    a wheel structure comprising
      a support member,
      a spine member coupled transversely lengthwise to the support member, the spine member defining a sheath,
      a brace member coupled transversely lengthwise to the spine member,
    a target mount,
      an upper measurement arm at least partially disposed within the sheath and configured to extend upward out of the top of the spine member,
      a lower measurement arm at least partially disposed within the sheath and configured to extend downward out of the bottom of the spine member,
      a sensor configured to measure the extension of the upper measurement arm and the lower measurement arm and generate corresponding extension data indicating the measurement, and
      a wireless transmitter in data communication with the sensor and configured to wirelessly transmit the extension data to the diagnostic processor; and
      a calibration target detachably coupled to the target mount, wherein the support member is configured to detachably mount onto a wheel of a vehicle and support the other components of the wheel structure while detachably mounted to the wheel.

11. The sensor calibration apparatus of claim 10, further comprising a display in data communication with the diagnostic processor.

12. The sensor calibration apparatus of claim 11, wherein the diagnostic processor is configured to present on the display a template of the vehicle with the wheel structure coupled to the wheel of the vehicle, the template providing a visual reference for a placement of the primary structure during calibration of a vehicle sensor.

13. The sensor calibration apparatus of claim 10, wherein the brace member comprises the target mount.

14. The sensor calibration apparatus of claim 10, wherein the upper measurement arm is configured to extend to an upper arch of a wheel well of the vehicle.

15. The sensor calibration apparatus of claim 10, wherein the lower measurement arm is configured to extend to the surface upon which the vehicle is supported.

16. The sensor calibration apparatus of claim 10, further comprising a battery in electrical connection with the sensor and the wireless transmitter.

17. A method for arranging a calibration apparatus of a vehicle sensor for calibration of the vehicle sensor, the calibration apparatus having a primary structure, a diagnostic processor, and a wheel structure, the method comprising:
   coupling the wheel structure to a wheel of a vehicle;
   extending an upper measurement arm of the wheel structure to an upper arch of a wheel well in which the wheel is disposed;
   extending a lower measurement arm of the wheel structure to the surface supporting the wheel;
   generating extension data, the extension data indicating the length between the upper arch and the surface;
   providing the extension data to the diagnostic processor;
   generating display data of the wheel structure coupled to the vehicle using a camera of the primary structure;
   transmitting the display data to the diagnostic processor corresponding to a position of the primary structure in relation to the vehicle;
   generating a reference template indicating a desired placement of the primary structure;
   presenting the display data superimposed with the reference template on a display of the diagnostic processor; and
   positioning the primary structure such that the display data matches the reference template on the display.

18. The method of claim 17, wherein the extension data is generated by a sensor configured to measure the displacement of the upper measurement arm and the lower measurement arm, and wherein the extension data is provided to the diagnostic processor by way of a wireless transmitter associated with the wheel structure.

19. The method of claim 17, wherein the transmitting the extension data comprises a wireless transmission and the transmitting the display data comprises a wireless transmission.

20. The method of claim 17, wherein coupling the wheel structure to the wheel further comprises engaging a support member of the wheel structure to a tread surface of a tire of the wheel such that the wheel structure is supported by the support member in a hanging configuration and the brace member rests against a hub surface of the wheel.

* * * * *